US010437922B2

(12) United States Patent
Olkin et al.

(10) Patent No.: US 10,437,922 B2
(45) Date of Patent: Oct. 8, 2019

(54) SPREADSHEET WITH UNIT BASED CONVERSIONS

(71) Applicant: Workday, Inc., Pleasanton, CA (US)

(72) Inventors: Terry M. Olkin, Niwot, CO (US); Brian Sean Morris, Boulder, CO (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 14/958,778

(22) Filed: Dec. 3, 2015

(65) Prior Publication Data

US 2017/0161250 A1 Jun. 8, 2017

(51) Int. Cl.

| | |
|---|---|
| ***G06F 17/00*** | (2019.01) |
| ***G06F 17/24*** | (2006.01) |
| ***G06F 17/21*** | (2006.01) |
| ***G06F 17/22*** | (2006.01) |
| ***G06F 17/27*** | (2006.01) |

(52) U.S. Cl.

CPC .......... *G06F 17/246* (2013.01); *G06F 17/215* (2013.01); *G06F 17/2264* (2013.01); *G06F 17/245* (2013.01); *G06F 17/2705* (2013.01)

(58) Field of Classification Search

CPC ............................. G06F 17/246; G06F 17/212
USPC ......................................... 715/212, 219, 220
See application file for complete search history.

(56) References Cited

U.S. PATENT DOCUMENTS

| | | | | |
|---|---|---|---|---|
| 4,012,725 A * | 3/1977 | Spangler | G06F 15/02 708/130 |
| 5,216,627 A | 6/1993 | McClellan | |
| 6,061,749 A * | 5/2000 | Webb | G06F 9/3879 345/603 |
| 6,259,456 B1 * | 7/2001 | Gibson | G06F 9/3879 345/501 |
| 6,948,154 B1 | 9/2005 | Rothermel | |
| 7,325,194 B2 | 1/2008 | Moore | |
| 7,454,701 B2 | 11/2008 | Graeber | |
| 8,161,372 B2 | 4/2012 | Ellis | |
| 8,190,897 B2 | 5/2012 | Chaudhary | |
| 8,739,121 B1 | 5/2014 | Jones | |
| 2002/0057446 A1 * | 5/2002 | Long | G06F 9/3879 358/1.13 |
| 2006/0036939 A1 | 2/2006 | Hobbs | |
| 2006/0212469 A1 * | 9/2006 | Babanov | G06F 17/241 |
| 2007/0214201 A1 | 9/2007 | Renshaw | |

(Continued)

FOREIGN PATENT DOCUMENTS

WO 2009086562 7/2009

OTHER PUBLICATIONS

Chambers, 'Reasoning About Spreadsheets with Labels and Dimensions', published Jul. 10, 2010, pp. 1-26.*

(Continued)

*Primary Examiner* — Stephen S Hong
*Assistant Examiner* — Matthew J Ludwig
(74) *Attorney, Agent, or Firm* — Van Pelt, Yi & James LLP

(57) ABSTRACT

A system for converting units of measure for spreadsheet cell values includes a processor. The processor is to host a spreadsheet document; associate a first measure and a first unit of measure; associate a second measure and a second unit of measure; determine whether the first unit of measure and the second unit of measure are comparable; and convert the first measure or the second measure into a third measure in the event that the first unit of measure and the second unit of measure are comparable.

9 Claims, 12 Drawing Sheets

(56) References Cited

U.S. PATENT DOCUMENTS

| | | | | |
|---|---|---|---|---|
| 2007/0244672 | A1 | 10/2007 | Kjaer | |
| 2007/0256004 | A1* | 11/2007 | Payette | G06F 17/246 |
| 2009/0055733 | A1* | 2/2009 | Graeber | G06F 17/246 715/271 |
| 2015/0169530 | A1 | 6/2015 | Otero | |
| 2015/0254226 | A1 | 9/2015 | Renshaw | |

OTHER PUBLICATIONS

Berger. "Nonstandard operator precedence in Excel." In: Computational statistics & data analysis. Mar. 1, 2007 (Mar. 1, 2007) Retrieved from <http://www.pucrs.br/famat/viali/tic_literatura/artigos/planilhas/csda07.pdf>.

Gordon S. Novak Jr. "Conversion of units of measurement." IEEE Transactions on Software Engineering 21.8 (1995).

Matt Klein, "Defining and Creating a Formula", published Feb. 11, 2014.

Novak et al. "Conversion of units of measurement." IEEE Transactions on Software Engineering, vol. 21, No. 8 (1995), pp. 651-661.

"TechSheet" Internet Citation Jan. 18, 2002 (Jan. 18, 2002). Retrieved from the Internet: URL:http://web.archive.org/web/20020118101046/http://www.technicalspreadsheet.com/ [retrieved on Sep. 12, 2005].

Ahmad et al. "A type system for statically detecting spreadsheet errors." 18th IEEE International Conference on Automated Software Engineering, 2003. Proceedings.. IEEE, 2003.

Antoniu et al. "Validating the unit correctness of spreadsheet programs." Proceedings of the 26th International Conference on Software Engineering. IEEE Computer Society, 2004.

Marcus P. Foster. "Quantities, units and computing." Computer Standards & Interfaces vol. 35 No. 5 (2013), pp. 529-535.

Rijgersberg et al. "How semantics can improve engineering processes: A case of units of measure and quantities." Advanced Engineering Informatics, vol. 25, No. 2 (2011), pp. 276-287.

* cited by examiner

401

| | A | B | C | D | E |
|---|---|---|---|---|---|
| 1 | | | | | |
| 2 | | **Addition** | | | |
| 3 | | **Value1** | **Value2** | **Value1 + Value2** | |
| 4 | | 1 hour | 10 minutes | 70 minutes | |
| 5 | | 10 meters | 10 feet | 42.808399 feet | |
| 6 | | 500 | 200 | 700 | |
| 7 | | 1 dollar | 7 light years | #VALUE! | |
| 8 | | | | | |

| | A | B | C | D | E |
|---|---|---|---|---|---|
| 1 | | | | | |
| 2 | | **Multiplication** | | | |
| 3 | | **Value1** | **Value2** | **Value1 * Value2** | |
| 4 | | 100 s | 9.8 $m/s^2$ | 980 m/s | |
| 5 | | 5 m | 6 m | 30 $m^2$ | |
| 6 | | 4 $ft^2$ | 2 in | 1152 $in^3$ | |
| 7 | | 25 m | 2 | 50 m | |
| 8 | | 4.5 yd | 2 wk | 9 yd*wk | |
| 9 | | 60 mi/hr | 4 hr | 240 mi | |
| 10 | | 4 mi/hr | 5 mi/hr | 20 $mi^2/hr^2$ | |
| 11 | | 500 | 2 | 1000 | |
| 12 | | | | | |

| | A | B | C | D | E |
|---|---|---|---|---|---|
| 1 | | | | | |
| 2 | | **Division** | | | |
| 3 | | **Value1** | **Value2** | **Value1 / Value2** | |
| 4 | | 5 km | 50 m | 100 | |
| 5 | | 1152 $in^3$ | 4 $ft^2$ | 2 in | |
| 6 | | 100m | 5 | 20 m | |
| 7 | | 55 mi | 1 hr | 55 mi/hr | |
| 8 | | 2 l/min | 0.5 l/min | 4 | |
| 9 | | 100 | 5 m | 20 1/m | |
| 10 | | | | | |

| | A | B | C | D |
|---|---|---|---|---|
| 1 | | | | |
| 2 | | **Unary Negation** | | |
| 3 | | **Value 1** | **-Value 1** | |
| 4 | | 1 USD | -1 USD | |
| 5 | | 7 ly | -7 ly | |
| 6 | | | | |

| | A | B | C | D | E |
|---|---|---|---|---|---|
| 1 | | | | | |
| 2 | | **Percent Operator** | | | |
| 3 | | **Value 1** | **%** | **Percent of Value 1** | |
| 4 | | 1 USD | 200 | 2 USD | |
| 5 | | 90 min | 50 | 45 min | |
| 6 | | | | | |

| | A | B | C | D | E |
|---|---|---|---|---|---|
| 1 | | | | | |
| 2 | | **Relational Operator** | | | |
| 3 | | **Value 1** | **Value 2** | **Value1 > Value2 ?** | |
| 4 | | 100 km | 100 mi | False | |
| 5 | | 90 min | 1 hr | True | |
| 6 | | 100 USD | 30 CAD | True | |
| 7 | | 4 day | 5 m | True | |
| 8 | | | | | |

| Function | Behavior |
|---|---|
| Sum | All Values in the Supplied Ranges must be Comparable. If any Value is not Comparable to the First value Processed, then #VALUE! will be Returned. |
| Average | Same as Sum |
| Product | Same as if Multiplying all the Values. |
| Count Functions | The Count Family of Functions will Ignore Units of Measure. |
| Randbetween | This Function will Operate on Comparable Values only and Return a Value in the First Unit of Measure given(i.e., in the First Argument). |

FIG. 13

SPREADSHEET WITH UNIT BASED CONVERSIONS

BACKGROUND OF THE INVENTION

Conventional spreadsheets allow users to enter a value into a cell and to assign a display format to the value. By assigning a display format, a user can convey additional context for a particular cell value. Conventional spreadsheets support display formats such as number, text, Boolean, date, and currency. The user can further apply different operations to the cell values and in certain situations the display format will propagate to the result of the operation. In some situations, a default display format will be applied to the result of the operation.

Circumstances exist where the cell display format is insufficient to determine the intended result. In some cases, this results in an inconvenience—the resulting display format does not provide the correct context but the user can manually modify the display format to display the resulting value as intended. In other cases, the result of an operation is incorrect—the resulting value is not the intended value regardless of the format used to display the calculated value. The use of a display format to provide context to a cell value constrains conventional spreadsheet applications from determining the intended result of the user.

BRIEF DESCRIPTION OF THE DRAWINGS

Various embodiments of the invention are disclosed in the following detailed description and the accompanying drawings.

FIG. 4 is a diagram illustrating an embodiment of a display of a unit-based spreadsheet document applying the addition operator.

FIG. 5 is a diagram illustrating an embodiment of a display of a unit-based spreadsheet document applying the multiplication operator.

FIG. 6 is a diagram illustrating an embodiment of a display of a unit-based spreadsheet document applying the division operator.

FIG. 7 is a diagram illustrating an embodiment of a display of a unit-based spreadsheet document applying the unary negation operator.

FIG. 8 is a diagram illustrating an embodiment of a display of a unit-based spreadsheet document applying the percent operator.

FIG. 9 is a diagram illustrating an embodiment of a display of a unit-based spreadsheet document applying the greater than relational operator.

FIG. 13 is a table illustrating an embodiment of unit-based functions for a spreadsheet application.

DETAILED DESCRIPTION

Figure 1:
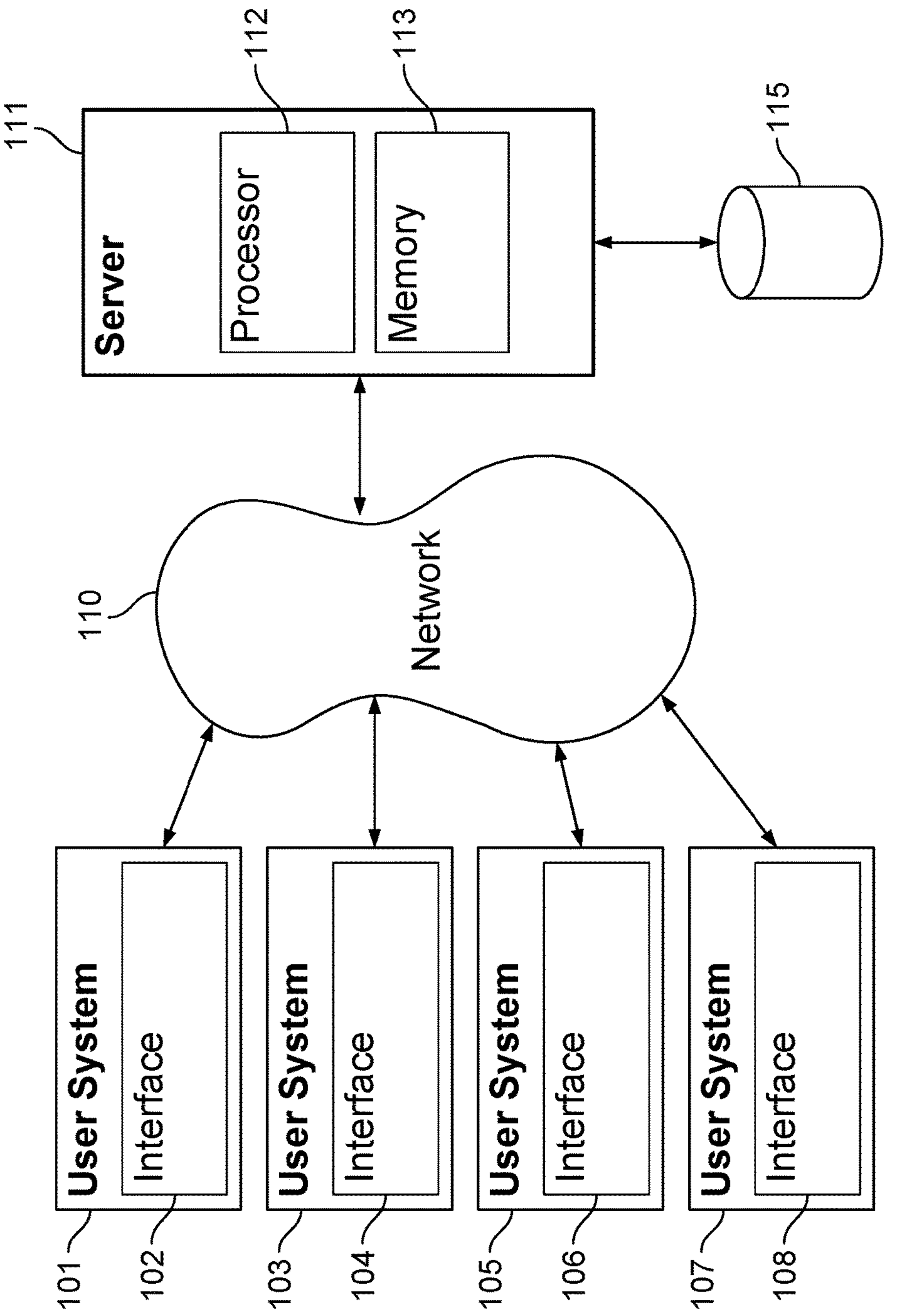
FIG. 1 is a block diagram illustrating an embodiment of a unit-based spreadsheet system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for parsing units of measure for spreadsheet cell values is disclosed. The system comprises a processor. The processor is to host a spreadsheet document; receive a cell value entered into a cell of the spreadsheet document, parse the cell value to determine whether the cell value includes at least a measure and a unit of measure; and associate a valid measure and a valid unit of measure with the cell in the event the measure and the unit of measure are valid. The associated measure and unit of measure is a measured value. In some embodiments, the processor is coupled to a memory, which is configured to provide the processor with instructions.

A system for converting units of measure for spreadsheet cell values is disclosed. The system comprises a processor. The processor is to host a spreadsheet document; associate a first measure and a first unit of measure; associate a second measure and a second unit of measure; determine whether the first unit of measure and the second unit of measure are comparable; and convert the first measure into a third measure in the event that the first unit of measure and the second unit of measure are comparable. In some embodiments, the processor is coupled to a memory, which is configured to provide the processor with instructions.

A system for performing units-based math for spreadsheet cell values is disclosed. The system comprises a processor. The processor is to host a spreadsheet document; parse a formula that includes a first measure, a first unit of measure, and an operator. In the event that the first unit of measure and the operator are compatible, the processor is to determine a resulting measure by applying the operator to the first measure; determine a resulting unit of measure; and associate the resulting measure with the resulting unit of measure. In some embodiments, the processor is coupled to a memory, which is configured to provide the processor with instructions.

A system for performing units-based math for spreadsheet cell values is disclosed. The system comprises a processor. The processor is to host a spreadsheet document; parse a formula that includes a first measure, a first unit of measure, a second measure, a second unit of measure, and an operator. In the event that the first unit of measure, the second unit of measure, and the operator are compatible, the processor is to determine a resulting measure and a resulting unit of measure by applying the operator to the first measure, the first unit of measure, the second measure, and the second unit of measure, and to associate the resulting measure with the resulting unit of measure. In some embodiments, the processor is coupled to a memory, which is configured to provide the processor with instructions.

In some embodiments, the system enables the parsing of units of measure for spreadsheet cell values. For example, a user accesses a spreadsheet document hosted by a spreadsheet application. In some embodiments, the spreadsheet application is hosted on a software as a service (SaaS) platform. The user enters into a cell of the spreadsheet document a cell value that includes a measure and a unit of measure. The spreadsheet application processes the cell value by parsing the cell value to determine whether the cell value contains a measure and unit of measure. In the event that the measure and unit of measure are valid, the spreadsheet application associates the valid measure and valid unit of measure with the cell. In some embodiments the measure is a numeric value. In some embodiments, the measure and unit of measure are distinct from the display format.

In some embodiments, improved computer functionality is achieved by associating a measure with a unit of measure. In some embodiments, a value associated with a spreadsheet cell having a valid measure and unit of measure is displayed on a graphical user interface with the measure and a representation of the unit of measure in the cell. The measured value, including both the measure and unit of measure, is distinct from a display format and in some embodiments a cell includes both a measured value and a display format property. In some embodiments, in the event the cell does not include a unit of measure, the spreadsheet application associates with the measure and cell a dimensionless property and no representation of a unit of measure is displayed. In some embodiments, in the event the cell does not include a unit of measure, the spreadsheet application associates a default unit of measure with the measure.

In some embodiments, a measure and a unit of measure are entered into a cell separated by a delimiter. The resulting measured value takes the format: number delimiter unit_of_measure. In various embodiments, a space is used as a delimiter. For example, the value "50 meters" includes the measure "50", the unit of measure "meters", and uses a space as a delimiter. Examples of valid measured values are: 10.00 USD, 9.8 m/sˆ2, 3 $m^2$, 12 in, 3 wk, and 55 mph. In some embodiments, a different character or sequence of characters is used as a delimiter. In some embodiments, the unit of measure conforms to a predefined pattern that is identified by the spreadsheet application. In some embodiments, the predefined pattern does not require the use of a delimiter. For example, the value "$50.0" includes the pattern "$", which matches to a unit of measure for currency in U.S. dollars. As another example, the value "USD50" includes the pattern "USD", which matches to a unit of measure for currency in U.S. dollars.

In some embodiments, combining base units of measure creates additional units of measure. As an example, a unit of measure is created by multiplying or dividing one unit of measure with another unit of measure. In various embodiments, multiplication is represented using the symbol "*" and division using the symbol "/". For example, a unit of measure is created based on speed by prepending a unit of measure to "/s" to create a unit of measure in terms of seconds. Prepending "m" to "/s" creates the unit of measure "m/s". Additional examples of combining units of measure include: m/s, mi/h, m/$s^2$, mg/wk, lb*ft. Using this functionality, a user combines different units of measure to represent areas and volumes using exponents (e.g., mˆ2, where 2 is an exponent and mˆ2 is equivalent to $m^2$, or inˆ3, where 3 is an exponent and inˆ3 is equivalent to $in^3$). In addition to units of measure for area and volume, a user creates other dimensional units of measure using other positive integer values (e.g., ftˆ4, where 4 is an exponent and ftˆ4 is equivalent to $ft^4$, or mˆ5, where 5 is an exponent and mˆ5 is equivalent to $m^5$).

In some embodiments, adding a prefix to a unit of measure creates another unit of measure. For example, an International System of Units (SI) prefix is prepended to a unit of measure to represent a different unit of measure (e.g., mm for millimeters, Em for exa-meters, etc.). In some embodiments, SI prefixes are prepended to any metric value to create a valid unit of measure.

In some embodiments, a value associated with a spreadsheet cell having a valid measure and valid unit of measure is displayed on a graphical user interface with the measure and a representation of the unit of measure in the cell. In some embodiments, the displayed measured value is presented exactly as the value is entered into the cell. In some embodiments, equivalent units of measure are converted to a standard unit of measure prior to displaying the unit of measure in a cell. For example, equivalent units of measure for currency in U.S. dollars ("USD" and "$") are converted to a single unit of measure. As another example, inˆ2/in is converted to in. In some embodiments, in the event the cell does not contain a unit of measure, the spreadsheet application associates with the measure and cell a dimensionless property and no representation of a unit of measure is displayed.

In the following, the term comparable is used for unit-based conversions; measured values that are comparable can be converted between units of measure—it means that both units of measure are in the same dimension (e.g., distance, mass, etc.). The term compatible is used for unit-based math. Compatibility is dependent on the math operator involved. For example, multiplication requires compatible arguments but not comparable ones (e.g., 5 km and 1 hr yielding 5 km*1 hr). For another example, when adding to measured values, compatible requires that the arguments also be comparable.

In some embodiments, the system enables the converting of units of measure for spreadsheet cell values. For example, a spreadsheet document is hosted by a spreadsheet application. In some embodiments, the spreadsheet application is hosted on a software as a service (SaaS) platform. The spreadsheet application associates a first measure and a first unit of measure with a cell value. The spreadsheet application further associates a second measure and a second unit of measure with a cell value. In some examples, the two measures and units of measure are entered into the same cell.

In other examples, the two measures and units of measure are entered into different cells. The spreadsheet application determines whether the first unit of measure and the second unit of measure are comparable. For example, two units of measure that both measure length are comparable. In another example, one unit of measure in temperature and another in length are not comparable. In some embodiments, two units of measure having the same dimension are comparable. In some embodiments, measures that are dimensionless are treated as plain numbers and are comparable with other dimensionless measures. In the event the two units of measure are comparable, the spreadsheet application converts one of the measures into a third measure based on a relationship between the two units of measure. In some embodiments, comparable measures are converted using mathematical transformations. In some embodiments, a mathematical transformation includes the identity transform.

In some embodiments, two units of measure that both measure length are comparable. For example, a measure in miles and a measure in kilometers both belong to the dimension length and are comparable. In various embodiments, the spreadsheet application converts the measure in miles into kilometers, the spreadsheet application converts the measure in kilometers into miles, the spreadsheet application converts both measures into a third length measure (e.g., feet, meters, etc.), or any other appropriate conversion. In some embodiments, the measure that is converted is determined by a predefined configuration or rule. As an example, a rule for determining which measure to convert is to always convert the measure with the larger unit of measure. Another example of a rule is to always convert the first measure encountered when processing multiple measures and units of measure in a formula or expression. In some embodiments, a rule is to convert to a preferred list of units of measure.

In some embodiments, the system performs unit-based math for spreadsheet values. For example, a spreadsheet document is hosted by a spreadsheet application. In some embodiments, the spreadsheet application is hosted on a software as a service (SaaS) platform. The spreadsheet application parses a formula containing a measure, a unit of measure, and an operator. In some embodiments, the operator includes mathematical operators. In some embodiments, the operator is implemented using a spreadsheet function. For example, a cell containing the formula=ROUNDUP ($95.50, 0) is parsed by the spreadsheet application. The spreadsheet application determines a valid measure (95.50), a valid unit of measure (currency in U.S. dollars), and an operator (ROUNDUP) with an argument specifying the number of decimal digits to round to (0). In the event the unit of measure and the operator are compatible, the spreadsheet application determines the resulting measure by applying the operator to the measure. In the previous example, the operator (ROUNDUP) is compatible with the unit of measure (currency in U.S. dollars), and the operator is applied to the measure (95.50) to calculate a resulting measure (96). The spreadsheet application further determines the resulting unit of measure. In some embodiments, the resulting unit of measure for the ROUNDUP operator is the same unit of measure initially entered in the cell. In the example discussed, the resulting unit of measure is currency in U.S. dollars. In some embodiments, the resulting unit of measure is a default unit of measure. For example, a default unit of measure is currency in euros when the operator is performed on currency. In some embodiments, the default unit of measure differs depending on the operator and the unit of measure supplied to the operator. Once the resulting measure and resulting unit of measure are determined, the spreadsheet application associates the two together. In the previous example, the result associates together the resulting measure (96) and the resulting unit of measure (currency in U.S. dollars). In some embodiments, the associated measure and unit of measure are displayed in the cell. In the previous example, the result is displayed as $96, 96 USD, or in any other appropriate manner.

In some embodiments, a unit of measure value is not allowed as a literal within a formula—a literal is entered in a cell as a value (i.e., without a leading=). In the event that it is desired to use a constant unit of measured value in a formula, then it is wrapped in the function TOUNITS( ). For example, the formula is written as =ROUNDUP(TOUNITS (95.50, "USD"), 0). An alternative is to say that some cell, A1, holds the measured value "95.50 USD" and then apply ROUNDUP to that from any other cell—for example, a formula: =ROUNDUP(A1,0).

In some embodiments, the system performs unit-based math for spreadsheet values where a formula contains an operator and two or more measured values. The spreadsheet application parses a formula containing a first measure, a first unit of measure, a second measure, a second unit of measure, and an operator. For example, a cell containing the formula=SUM(50 meters, 100 yards) is parsed by the spreadsheet application. As another example, a cell containing the formula=SUM(TOUNITS(50,"m"), TOUNITS(100, "yd")) is parsed by the spreadsheet application. As another example, a cell containing the formula=TOUNITS(50, "m")+TOUNITS(100,"yd") is parsed by the spreadsheet application. As another example, a cell A1 contains "50 m", a cell A2 contains "100 yd", a cell containing the formula=SUM(A1, A2) or the formula=A1+A2 is parsed by the spreadsheet application. The spreadsheet application determines a first valid measure (50), a first valid unit of measure (length in meters), a second valid measure (100), a second valid unit of measure (length in yards), and an operator (SUM). In the event the different units of measure and the operator are compatible, the spreadsheet application determines the resulting measure and the resulting unit of measure by applying the operator to the different measures and units of measure. The spreadsheet application associates the resulting measure with the resulting unit of measure.

In some embodiments, for certain operators, in the event the units of measure operated on by an operator are compatible and comparable but different, determining the resulting measure and resulting unit of measure requires converting one or more of the measured values. The conversion is based on the first unit of measure, the second unit of measure, and the operator. One or more measures are converted into a converted measure with an associated converted unit of measure before determining the resulting measure. As described herein, converting measured values requires that the starting unit of measure and the target unit of measure are comparable.

In the above example, the units of measure (length in meters and length in yards) are compatible with the operator (SUM) and the resulting measure is determined by applying the operator (SUM) to add the measure 50, which has unit of measure meters, to the measure 100, which has the unit of measure yards. The SUM operator requires that measured values are converted into like units of measure. Since the units of measure are different but comparable—one unit of measure is in meters and the other is in yards—the spreadsheet application converts one of the measures into a converted measure as described above. In some embodiments, the spreadsheet application selects the first measure to convert. In this example, the first measure (50) is converted by applying a conversion from the first unit of measure (meters) into a resulting converted unit of measure (yards) to determine a converted measure (54.68). The combination of the converted measure and the converted unit of measure is a converted measured value (54.68 yards). The resulting unit of measure is based on the converted unit of measure. In the example, the second unit of measure (length in yards) and the converted unit of measure (length in yards) are consistent and used as the resulting unit of measure and the result of the operation is then calculated using the resulting unit of measure (e.g., 154.68 yards). In some embodiments, the spreadsheet application selects the second measure to convert. In this example, the second measure (100) is converted by applying a conversion from the second unit of measure (yards) into a resulting converted unit of measure (meters) to determine a converted measure (91.44). The combination of the converted measure and the converted unit of measure is a converted measured value (91.44 meters). The resulting unit of measure is based on the converted unit of measure. In the example, the first unit of measure (length in meters) and the converted unit of measure (length in meters) are consistent and used as the resulting unit of measure and the result of the operation is then calculated using the resulting unit of measure (e.g., 141.44 meters). In some embodiments, both units of measure are converted to a preferred unit of measure and the operation is calculated and the result is provided using the preferred unit of measure (e.g., both yards and meters are converted to feet and the result is provided in feet). In some embodiments, the preferred unit of measure is looked up in a database of preferred units of measure.

In some embodiments, the functionality to process and enforce rules associated with measured values is enabled/disabled at a workbook level. In the event that the functionality is enabled, the spreadsheet application applies various rules to the measured values as explained herein. For example, rules are configured in the spreadsheet application for parsing measured values, for converting a measured value into a different unit of measure, and for applying operators on measured values. In some embodiments, the parsing of measured values requires a valid measure and a valid unit of measure. In some embodiments, the converting of a measured value requires that the measured value and the target unit of measure are comparable. In some embodiments, the application of an operator on one or more measured values requires that the operator and the measured values are compatible. Additional rules are described herein. In the event that no rule is satisfied, in some embodiments, the spreadsheet application returns a no value error (e.g., #VALUE!).

FIG. 1 is a block diagram illustrating an embodiment of a unit-based spreadsheet system. In the example shown, application server 111 includes processor 112 and memory 113. Application server 111 is coupled to external storage 115 so that application server 111 is able to store information to and access information from external storage 115. In various embodiments, external storage 115 comprises one or more of the following: a database, a cluster of databases, a solid state memory, a hard disc, a redundant array of discs, or any other appropriate storage hardware. In various embodiments, storage for application server 111 uses memory 113 or internal storage comprising a database, a cluster of databases, a solid state memory, a hard disc, a redundant array of discs, or any other appropriate storage hardware. Application server 111 is also coupled to network 110. In some embodiments, network 110 comprises one or more of the following: a local area network, a wide area network, a wired network, a wireless network, the Internet, or any other appropriate network or combination of networks. User system 101, user system 103, user system 105, and user system 107 access application server 111 via network 110. In some embodiments, user system 101, user system 103, user system 105, and user system 107 access an application running on application server 111 (e.g., a spreadsheet document application). In some embodiments, a spreadsheet application presents a spreadsheet based on stored data. In some embodiments, the data stored comprises spreadsheet data and metadata. User system 101 includes a user interface 102 used to access application server 111. In some embodiments, user interface 102 is used to access an application running on application server 111. In some embodiments, user interface 102 relies on a web browser to access a spreadsheet application running on application server 111. Similarly, user system 103 includes interface 104, user system 105 includes interface 106, and user system 107 includes interface 108

In various embodiments, application server 111 comprises one or more physical servers with one or more processors, one or more memories, and one or more other storage devices (e.g., hard drives, array of drives, etc.) and/or one or more virtual environments (e.g., virtualization of operating system or application processes) in which an application is executed. In some examples, application server 111 comprises one or more servers that are part of a software as a service (SaaS) platform. In some embodiments, a processor is coupled to a memory and the memory is configured to provide the processor with instructions.

Figure 2:
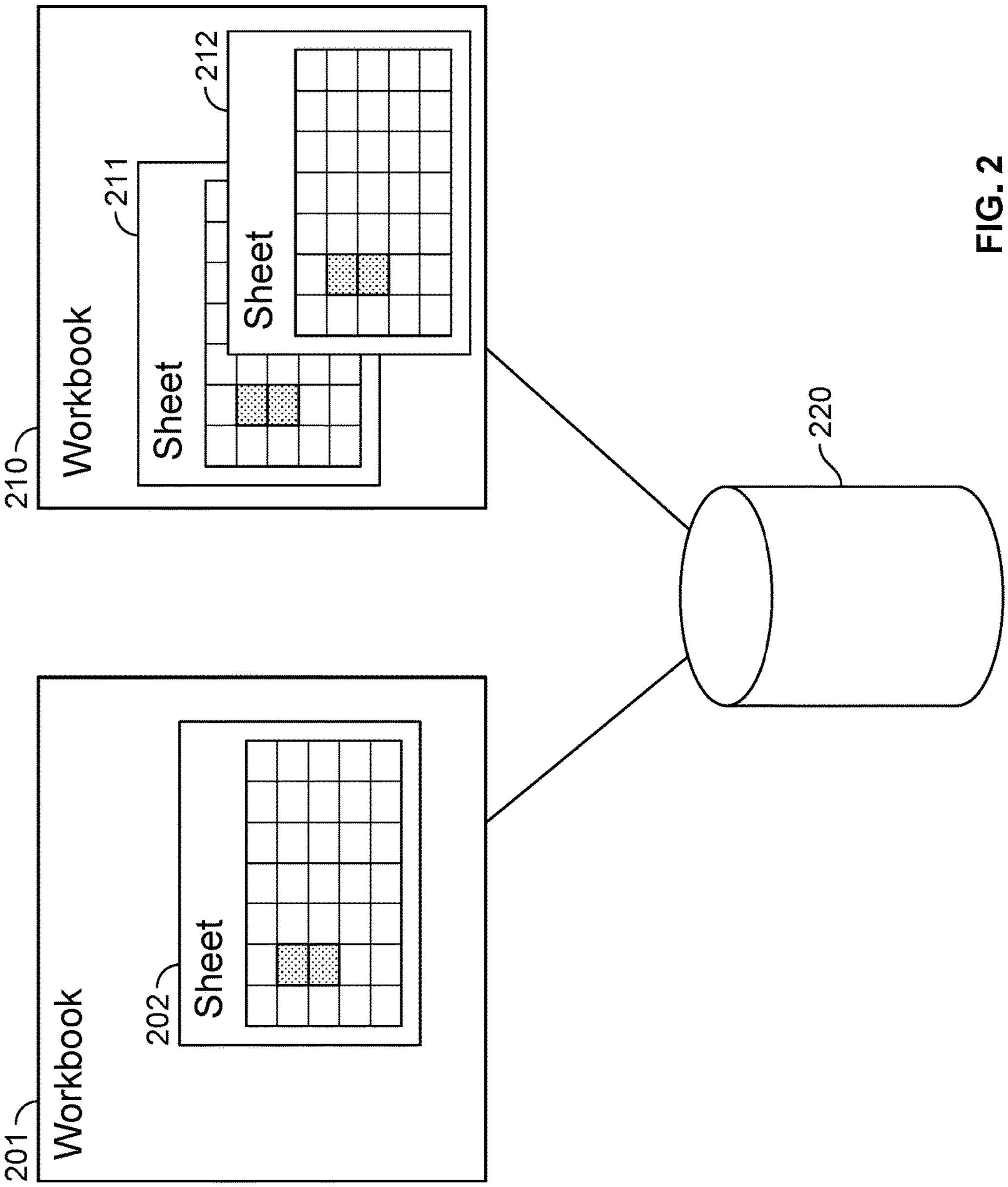
FIG. 2 is a block diagram illustrating an embodiment of a unit-based spreadsheet system.

FIG. 2 is a block diagram illustrating an embodiment of a unit-based spreadsheet system. In some embodiments, the system of FIG. 2 comprises a spreadsheet application executing on application server 111 of FIG. 1. In some embodiments, workbooks 201 and 210 are hosted on application server 111 of FIG. 1. In some embodiments, external storage 220 utilizes external storage 115 of FIG. 1. In the example shown, workbook 201 and workbook 210 are two different spreadsheet documents. Workbook 201 includes a single sheet 202. Workbook 210 includes sheet 211 and sheet 212. The data corresponding to workbook 201 and workbook 210, including the data in sheet 202, sheet 211, and sheet 212, are stored in external storage 220. In some embodiments, external storage 220 comprises a remote database, database cluster, or any other appropriate data storage device or system.

Figure 3:
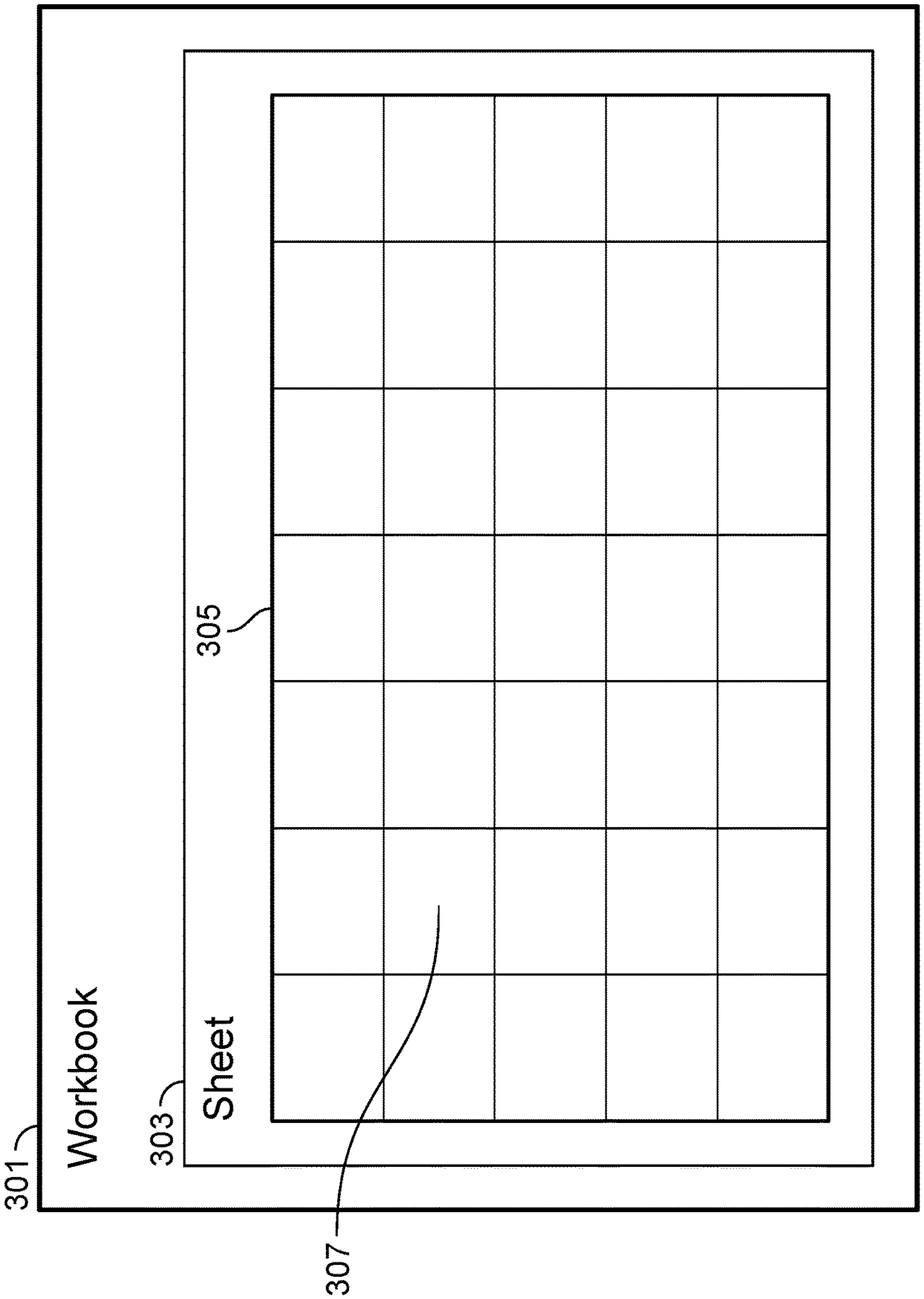
FIG. 3 is a block diagram illustrating an embodiment of a unit-based spreadsheet document.

FIG. 3 is a block diagram illustrating an embodiment of a unit-based spreadsheet document. In some embodiments, workbook 301 is hosted on application server 111 of FIG. 1. In some embodiments, workbook 301 comprises workbook 201 and/or workbook 210 of FIG. 2. In the example shown, workbook 301 includes a sheet (e.g., sheet 303) of a spreadsheet document. Workbooks include one or more sheets. Sheet 303 includes a table of cells 305. Table of cells 305 is arranged in a grid. Table of cells 305 includes a plurality of cells (e.g., including cell 307). In some embodiments, cell 307 includes a cell value that includes a measured value, that is, an associated measure and unit of measure. In some embodiments, cell 307 includes a formula that includes one or more measured values and one or more operators. In some embodiments, the formula also includes one or more dimensionless measures.

Addition and Subtraction Operator:

FIG. 4 is a diagram illustrating an embodiment of a display of a unit-based spreadsheet document applying the addition operator. In some embodiments, the display of FIG. 4 is a display of a workbook executing as an application on application server 111 of FIG. 1. In some embodiments, table 401 comprises table 305 of FIG. 3. In the example shown, table 401 is a table of cells in a sheet of a workbook. Table 401 includes cells B4 to C7 (8 total cells) that each contains a measure and a unit of measure, or a dimensionless measure as such:

cell B4 contains a measure (1) and a unit of measure (hour);

cell C4 contains a measure (10) and a unit of measure (minutes);

cell B5 contains a measure (10) and a unit of measure (meters);

cell C5 contains a measure (10) and a unit of measure (feet);

cell B6 contains a dimensionless measure (500);

cell C6 contains a dimensionless measure (200);

cell B7 contains a measure (1) and a unit of measure (dollar); and cell C7 contains a measure (7) and a unit of measure (light years).

In FIG. 4, the cells in D4:D7 each contain a formula using an addition operator. Each cell contains a formula that applies the addition operator to the two cells to the left of it (columns B and C of the same row). For example, cell D4 (70 minutes) contains a formula that is the addition of cells B4 (1 hour) and C4 (10 minutes); cell D5 (42.808399 feet) contains a formula that is the addition of cells B5 (10 meters) and C5 (10 feet); cell D6 (700) contains a formula that is the addition of cells B6 (500) and C6 (200); and cell D7 (#VALUE!) (cell 402) contains a formula that is the addition of cells B7 (1 dollar) and C7 (7 light years).

In various embodiments, a unit of measure of an hour is designated by "h", "hr", or any other appropriate abbreviation. In some embodiments, a unit of measure of a minute is designated as "min". In some embodiments, a unit of measure of a meter is designated as "m". In some embodiments, a unit of measure of a foot is designated as "ft". In some embodiments, a unit of measure of a dollar is designated as "USD". In some embodiments, a unit of measure of a light year is designated as "ly".

In some embodiments, the addition and subtraction operators produce a valid result only if all units of measure are comparable. Two units of measure are comparable in the event that each unit of measure can be converted to the other. As shown in FIG. 4, the measured values of cells B4 and C4 are compatible using the addition operator since the units of measure hour and minutes are comparable. As another example, the measured values of cells B5 and C5 are compatible since the units of measure meters and feet are comparable. Values in cells B6 and C6 are compatible since two dimensionless units are comparable. In some embodiments, in the event that the units of measure are not comparable, the units of measure are not compatible and an error message is displayed. In the example shown, values in cells B7 (1 dollar) and C7 (7 light years) are incompatible when applied to the addition operator since the units of measure dollar and light years are not comparable. As a result, the error message "#VALUE!" is displayed in cell D7 402.

Multiplication Operator:

FIG. 5 is a diagram illustrating an embodiment of a display of a unit-based spreadsheet document applying the multiplication operator. In some embodiments, the display of FIG. 5 is a display of a workbook executing as an application on application server 111 of FIG. 1. In some embodiments, table 501 comprises table 305 of FIG. 3. In the example shown, table 501 is a table of cells in a sheet of a workbook. Table 501 includes cells B4 to C11 (16 total cells) that each contains a measure and a unit of measure, or a dimensionless measure as such:

cell B4 contains a measure (100) and a unit of measure (s);

cell C4 contains a measure (9.8) and a unit of measure ($m/s^2$);

cell B5 contains a measure (5) and a unit of measure (m);

cell C5 contains a measure (6) and a unit of measure (m);

cell B6 contains a measure (4) and a unit of measure ($ft^2$);

cell C6 contains a measure (2) and a unit of measure (in);

cell B7 contains a measure (25) and a unit of measure (m);

cell C7 contains a dimensionless measure (2);

cell B8 contains a measure (4.5) and a unit of measure (yd);

cell C8 contains a measure (2) and a unit of measure (wk);

cell B9 contains a measure (60) and a unit of measure (mi/hr);

cell C9 contains a measure (4) and a unit of measure (hr);

cell B10 contains a measure (4) and a unit of measure (mi/hr);

cell C10 contains a measure (5) and a unit of measure (mi/hr);

cell B11 contains a dimensionless measure (500); and cell C11 contains a dimensionless measure (2).

In FIG. 5, the cells in D4:D11 each contain a formula using a multiplication operator. Each cell contains a formula that applies the multiplication operator to the two cells to the left of it (columns B and C of the same row). For example, cell D4 (980 m/s) contains a formula that is the multiplication of cells B4 (100 s) and C4 (9.8 $m/s^2$); cell D5 (30 $m^2$) contains a formula that is the multiplication of cells B5 (5 m) and C5 (6 m); cell D6 (1152 $in^3$) contains a formula that is the multiplication of cells B6 (4 $ft^2$) and C6 (2 in); cell D7 (50 m) contains a formula that is the multiplication of cells B7 (25 m) and C7 (2); cell D8 (9 yd*wk) contains a formula that is the multiplication of cells B8 (4.5 yd) and C8 (2 wk); cell D9 (240 mi) contains a formula that is the multiplication of cells B9 (60 mi/hr) and C9 (4 hr); cell D10 (20 $mi^2/hr^2$) contains a formula that is the multiplication of cells B10 (4 mi/hr) and C10 (5 mi/hr); and cell D11 (1000) contains a formula that is the multiplication of cells B11 (500) and C11 (2). In some embodiments, mi/hr is designated as mph—for example, in the event that mi/hr is entered it is converted to mph.

In some embodiments, the multiplication operator produces a valid result only in the event that all units of measure are compatible. For multiplication, any measured values are compatible with one another and can be multiplied together. Any measured values are also compatible with dimensionless values and can be multiplied together. As shown in FIG. 5, cells from B4:B11 are compatible with their corresponding cell from cells C4:C11 and the resulting measured value from performing the multiplication operator is displayed in cells D4:D11.

In some embodiments, in the event the multiplication operator is applied to two measured values and the base units of measure are different but comparable, one measured value is converted to have the same base unit of measure as the other. In some embodiments, the order the units of measure are encountered in a formula is used to determine which unit of measure and measured value is converted. In some embodiments, the conversion is always towards the smaller unit of measure. Once any necessary conversions are performed, the resulting unit of measure is the converted base unit of measure raised to the nth power, where n is the sum of the power of the different units of measure or converted units of measure in the event that a conversion was necessary. As an example, in FIG. 5, cell B5 has value "5 m" and cell C5 has value "6 m". The two units of measure are comparable. No conversion is necessary since they have identical units of measure. The resulting unit of measure is the base unit of measure of the cells (m) raised to the power of 2, the sum of the power of the first unit of measure (1) and the power of the second unit of measure (1). The resulting measured value (30 $m^2$) has the unit of measure "$m^2$" as shown in cell D5.

As another example, in FIG. 5, cell B6 has value "4 $ft^2$" and cell C6 has value "2 in". The two base units of measure (ft and in) are comparable and a conversion is done since they are different. In some embodiments, the base unit of measure feet is converted to inches. In some embodiments, the base unit of measure inches is converted to feet. In the example, the measure 4 in unit of measure $ft^2$ is converted into the measure 576 in unit of measure $in^2$ using a mathematical transformation. Using the converted measure of cell B6 and the original measure of cell C6, the two measures are then multiplied (576*2) to determine the resulting measure (1152) for cell D6. The resulting unit of measure is determined by taking the sum of the power of the converted unit of measure of cell B6 ($in^2$ has a power of 2) and the power of the original unit of measure of cell C6 (in has a power of 1) to calculate the resulting unit of measure ($in^3$). The resulting measured value (1152 $in^3$) is shown in cell D6.

In some embodiments, dimensionless values are multiplied and the result is a dimensionless value. FIG. 5, row 11 provides an example of the multiplication operator performed on two dimensionless values. Cell D11 contains the formula that applies the multiplication operator to multiply the value of cell B11 (500) by the value of cell C11 (2). The result 1000 is displayed in cell D11 and is dimensionless since both B11 and C11 contain dimensionless values.

In some embodiments, any measured values are also compatible with dimensionless values and can be multiplied together. The result of the multiplication operator is a measured value that has the same unit of measure as the factor that is a measured value. FIG. 5, row 7 provides an example of the multiplication operator performed on a measured value in cell B7 (25 m) and a dimensionless value in cell C7 (2). Cell D7 contains the formula that applies the multiplication operator to multiply cell B7 by cell C7. The result 50 m is displayed in cell D7 and has the same unit of measure as cell B7 (m).

When applying the multiplication operator, in the event the units of measure are not comparable, the resulting measured value is the multiplication of the two measures associated with a unit of measure that is the multiplication of the original two units of measure. As an example, in FIG. 5, cell B8 has measured value "4.5 yd" and cell C8 has measured value "2 wk". Since the units of measure (yd and wk) are not comparable, the resulting measure (9) is the multiplication of the two measures (4.5 and 2) and the resulting unit of measure (yd*wk) is the multiplication of the original two units of measure (yd and wk). The resulting measured value (9 yd*wk) is shown in cell D8.

In some embodiments, the proper units of measure are carried through the multiplication operator. In some embodiments, an intermediary resulting unit of measure is converted into a proper resulting unit of measure by cancelling like units of measure. For example, in FIG. 5, cell B9 has measured value "60 mi/hr" and cell C9 has measured value "4 hr". Intermediary resulting unit of measure (mi*hr/hr) is converted into a proper resulting unit of measure (mi) by cancelling like units of measure (hr/hr). Multiplying the measured values of the two cells B9 and C9 results in the measured value "240 mi" shown in cell D9. As another example, in FIG. 5, cell B10 has measured value "4 mi/hr" and cell C10 has measured value "5 mi/hr". The result of multiplying the measured values of the two cells is the measured value "20 $mi^2/hr^2$" and is displayed in cell D9.

Division Operator:

FIG. 6 is a diagram illustrating an embodiment of a display of a unit-based spreadsheet document applying the division operator. In some embodiments, the display of FIG. 6 is a display of a workbook executing as an application on application server 111 of FIG. 1. In some embodiments, table 601 comprises table 305 of FIG. 3. In the example shown, table 601 is a table of cells in a sheet of a workbook. Table 601 includes cells B4 to C9 (12 total cells) that each contains a measure and a unit of measure, or a dimensionless measure as such:

cell B4 contains a measure (5) and a unit of measure (km);
cell C4 contains a measure (50) and a unit of measure (m);
cell B5 contains a measure (1152) and a unit of measure ($in^3$);
cell C5 contains a measure (4) and a unit of measure ($ft^2$);
cell B6 contains a measure (100) and a unit of measure (m);
cell C6 contains a dimensionless measure (5);
cell B7 contains a measure (55) and a unit of measure (mi);
cell C7 contains a measure (1) and a unit of measure (hr);
cell B8 contains a measure (2) and a unit of measure (l/min);
cell C8 contains a measure (0.5) and a unit of measure (l/min);
cell B9 contains a dimensionless measure (100); and
cell C9 contains a measure (5) and a unit of measure (m).

In FIG. 6, the cells in D4:D9 each contain a formula using a division operator. Each cell contains a formula that applies the division operator to the two cells to the left of it (columns B and C of the same row). For example, cell D4 (100) contains a formula that is the division of cell B4 (5 km) by cell C4 (50 m); cell D5 (2 in) contains a formula that is the division of cell B5 (1152 $in^3$) by cell C5 (4 $ft^2$); cell D6 (20 m) contains a formula that is the division of cell B6 (100 m) by cell C6 (5); cell D7 (55 mi/hr) contains a formula that is the division of cell B7 (55 mi) by cell C7 (1 hr); cell D8 (4) contains a formula that is the division of cell B8 (2 l/min) by cell C8 (0.5 l/min); and cell D9 (20 l/m) (cell 602) contains a formula that is the division of cell B9 (100) by cell C9 (5 m).

In some embodiments, the division operator produces a valid result only in the event that all units of measure are compatible. For division, any measured values are compatible with one another and can be divided to produce a valid resulting measured value. Any measured value can also be divided by a dimensionless value. The resulting unit of measure is the same as the measured value's unit of measure. In some embodiments, any dimensionless value can be divided by another dimensionless value and the result is a dimensionless value. In some embodiments, division of a dimensionless value by a measured value will result in 1 (one) over the measured value's unit of measure where 1 represents the dimensionless unit. As shown in FIG. 6, cells from B4:B9 are compatible with their corresponding cell from cells C4:C9 and the resulting measured value from performing the division operator is displayed in cells D4:D9.

In some embodiments, in the event the division operator is applied to two measured values and the base units of measure are comparable, one measured value is converted to the unit of measure of the other. In some embodiments, the order the units of measure are encountered in a formula is used to determine which unit of measure and measured value is converted. In various embodiments, the conversion will always be towards the smaller unit of measure. Once the converted unit of measure is determined, the resulting unit of measure is the base unit of measure raised to the nth power, where n is the power of the divisor's unit of measure subtracted from the dividend's unit of measure. In the event that a conversion was necessary, the converted units of measure are used. In some embodiments, in the event that the dividend and divisor have the same power for the units of measure and a conversion is performed, the resulting unit of measure is dimensionless.

As an example, in FIG. 6, cell B4 has value "5 km" and cell C4 has value "50 m". The two units of measure are comparable and a conversion is done since they are different. In some embodiments, the base unit of measure km is converted to m. In various embodiments, the base unit of measure m is converted to km. In the example, the measure 5 in unit of measure km is converted into the measure 5000 in unit of measure m using a mathematical transformation. Using the converted measure of cell B4 and the original measure of cell C4, the two measures are then divided (5000÷50) to determine the resulting measure (100) for cell D4. The resulting unit of measure is dimensionless since the unit of measure of cell C4 (m) cancels out the converted unit of measure of cell B4 (also m). The resulting dimensionless value (100) is shown in cell D4.

As an example, in FIG. 6, cell B5 has value "1152 $in^3$" and cell C5 has value "4 $ft^2$". The two units of measure are comparable and a conversion is done since they are different. In the example, the measure 4 in unit of measure $ft^2$ is converted into the measure 576 in unit of measure $in^2$ using a mathematical transformation. Using the original measure of cell B5 (the dividend) and the converted measure of cell C5 (the divisor), the two measures are then divided (1152÷576) to determine the resulting measure (2) for cell D5. The resulting unit of measure is determined by subtracting the power of the divisor's converted unit of measure ($in^2$ has a power of 2) from the dividend's unit of measure ($in^3$ has a power of 3). The resulting unit of measure is the base unit of measure (in) raised to the power of 1. The resulting measured value (2 in) is shown in cell D5.

In some embodiments, any measured value divided by a dimensionless value produces a resulting unit of measure with the measured value's unit of measure. FIG. 6, row 6 provides an example of the division operator performed where a measured value is divided by a dimensionless value. Cell D6 contains the formula that applies the division operator to divide the measured value of cell B6 (100 m) by the dimensionless value of cell C6 (5). The result 20 m is displayed in cell D6 and has the unit of measure of the dividend (B6).

In some embodiments, FIG. 6, row 9 provides an example of the division operator applied to divide a dimensionless value by a measured value. Cell D9 602 contains the formula that applies the division operator to divide the dimensionless value of cell B9 (100) by the measured value of cell C9 (5 m). The result 20 l/m is displayed in cell D9 and has the unit of measure of one over the divisor (B9).

When applying the division operator, in the event the units of measure are not comparable, the resulting measured value is the division of the dividend's measure by the divisor's measure associated with a unit of measure that is the dividend's unit of measure divided by the divisor's unit of measure. As an example, in FIG. 6, cell B7 has measured value "55 mi" and cell C7 has measured value "1 hr". Since the units of measure (mi and hr) are not comparable, the resulting measure (55) is the division of dividend's measure by the divisor's measure (55÷1). The resulting unit of measure (mi/hr) is the division of the dividend's unit of measure by the divisor's unit of measure (mi÷hr). The resulting measured value (55 mi/hr) is shown in cell D7.

In some embodiments, the proper units of measure are carried through the division operator. In some embodiments, the result of the dividend's unit of measure divided by the divisor's unit of measure is an intermediary resulting unit of measure. The intermediary resulting unit of measure is converted into a proper resulting unit of measure by cancelling like units of measure. For example, in FIG. 6, cell B8 has measured value "2 l/min" and cell C8 has measured value "0.5 l/min". Intermediary resulting unit of measure (l/min/l/min) is converted into a proper resulting dimensionless unit by cancelling like units of measure (l/min). Dividing the measured value of cells B8 by C8 results in dimensionless measure "4" shown in cell D8.

Unary Negation Operator:

FIG. 7 is a diagram illustrating an embodiment of a display of a unit-based spreadsheet document applying the unary negation operator. In some embodiments, the display of FIG. 7 is a display of a workbook executing as an application on application server 111 of FIG. 1. In some embodiments, table 701 comprises table 305 of FIG. 3. In the example shown, table 701 is a table of cells in a sheet of a workbook. Table 701 includes cells B4 and B5 that each contains a measure and a unit of measure as such:

cell B4 contains a measure (1) and a unit of measure (USD); and cell B5 contains a measure (7) and a unit of measure (ly).

In FIG. 7, the cells in C4 and C5 each contain a formula using a unary negation operator. Each cell contains a formula that applies the unary negation operator to the cell to the left of it (column B of the same row). For example, cell C4 (−1 USD) contains a formula that is the unary negation of cell B4 (1 USD) and cell C5 (−7 ly) contains a formula that is the unary negation of cell B5 (7 ly).

In some embodiments, the unary negation operator is compatible with any measured value and produces a valid result. The resulting measure is the negated measure and the resulting unit of measure is the same as the measured value's unit of measure. As shown in FIG. 7, cell C4 (−1 USD) displays a valid result of the unary negation of the measured value of cell B4 (1 USD) and cell C5 (−7 ly) displays a valid result of the unary negation of the measured value of cell B5 (7 ly).

Percent Operator:

FIG. 8 is a diagram illustrating an embodiment of a display of a unit-based spreadsheet document applying the percent operator. In some embodiments, the display of FIG. 8 is a display of a workbook executing as an application on application server 111 of FIG. 1. In some embodiments, table 801 comprises table 305 of FIG. 3. In the example shown, table 801 is a table of cells in a sheet of a workbook. Table 801 includes cells B4 to C5 (4 total cells) that each contains a measure and a unit of measure, or a dimensionless measure as such:

cell B4 contains a measure (1) and a unit of measure (USD);

cell C4 contains a dimensionless measure (200);

cell B5 contains a measure (90) and a unit of measure (min); and cell C5 contains a dimensionless measure (50).

In FIG. 8, the cells in D4 and D5 each contain a formula using a percent operator. Each cell contains a formula that applies the percent operator to the cell of the same row in column B using the percentage in column C of the same row. For example, cell D4 (2 USD) contains a formula that calculates a percentage set in cell C4 (200) of the measured value in cell B4 (1 USD); and cell D5 (45 min) contains a formula that calculates a percentage set in cell C5 (50) of the measured value in cell B5 (90 min).

In some embodiments, the percent operator produces a valid result on any measured value. The resulting unit of measure is the same as the measured value's unit of measure. In some embodiments, the percent operator takes a dimensionless measure that is the percent value to be applied to a measured value. As shown in FIG. 8, cell D4 (2 USD) displays a valid result of the percent set in cell C4 (200) of the measured value of cell B4 (1 USD) and cell D5 (45 min) displays a valid result of the percent set in cell C5 (50) of the measured value of cell B5 (90 min). In various embodiments, the percent operator takes a decimal representation of the percent value.

Relational Operators:

FIG. 9 is a diagram illustrating an embodiment of a display of a unit-based spreadsheet document applying the greater than relational operator. In some embodiments, the display of FIG. 9 is a display of a workbook executing as an application on application server 111 of FIG. 1. In some embodiments, table 901 comprises table 305 of FIG. 3. In the example shown, table 901 is a table of cells in a sheet of a workbook. Table 901 includes cells B4 to C7 (8 total cells) that each contains a measure and a unit of measure, or a dimensionless measure as such:

cell B4 contains a measure (100) and a unit of measure (km);

cell C4 contains a measure (100) and a unit of measure (mi);

cell B5 contains a measure (90) and a unit of measure (min);

cell C5 contains a measure (1) and a unit of measure (hr)

cell B6 contains a measure (100) and a unit of measure (USD);

cell C6 contains a measure (30) and a unit of measure (CAD);

cell B7 contains a measure (4) and a unit of measure (day); and cell C7 contains a measure (5) and a unit of measure (m).

In FIG. 9, the cells in D4:D7 each contain a formula using a greater than relational operator. Each cell contains a formula that applies the greater than operator to compare the two cells to the left of it (columns B and C of the same row). For example, cell D4 (FALSE) contains a formula that calculates whether the measured value of cell B4 (100 km) is greater than the measured value in cell C4 (100 mi); cell D5 (TRUE) contains a formula that calculates whether the measured value of cell B5 (90 min) is greater than the measured value in cell C5 (1 hr); cell D6 (TRUE) contains a formula that calculates whether the measured value of cell B6 (100 USD) is greater than the measured value in cell C6 (30 CAD); and cell D7 (TRUE) contains a formula that calculates a response similar to a spreadsheet relational operator as to whether the measured value of cell B7 (4 day) is greater than the measured value in cell C7 (5 m). For example, for some spreadsheets any two values, no matter what they represent, are comparable. In some embodiments, for a spreadsheet any two values are comparable via the relational operations (e.g., greater than, less than, equals, etc.). In some embodiments, a spreadsheet application defines an arbitrary ordering amongst different types (e.g., numbers, Booleans, etc.) and/or dimensions to ensure that one value is greater than or less than the other so that applying a relational operator (e.g., <, >, =, etc.) to any two values results in TRUE or FALSE. For units within the same dimension that are comparable, the relational outcome is as expected—for example, comparing a value with a length dimension of yards and a length dimension of meters. However, for units with different dimensions that are not normally comparable, the relational operator outcome is defined using a predetermined ordering of the dimensions.

In some embodiments, the relational operators produce a valid result only in the event that all units of measure are compatible. In some embodiments, the supported relational operators include: greater than, greater than or equal to, less than, less than or equal to, equal to, and not equal to. In some embodiments, for relational operators, measured values are compatible only if they are comparable. As shown in FIG. 9, cells from B4:B6 are compatible with their corresponding cell from cells C4:C6 when applying the greater than relational operator. The resulting Boolean value from applying the greater than relational operator is displayed in cells D4:D7. The measured values of cells B7 (4 days) and C7 (5 m) are incompatible and, in some embodiments, evaluating a relational operator between two incompatible values is based on an arbitrary predetermined ordering of their respective dimensions.

In some embodiments, in the event a relational operator is applied to two measured values and the units of measure are the same, the Boolean result is calculated by applying the relational operator to the two measures. In the event a relational operator is applied to two measured values and units of measure are different and comparable, one measured value is converted to the unit of measure of the other and the Boolean result is calculated by applying the relational operator using the converted measure. In some embodiments, the order the units of measure are encountered in a formula is used to determine which unit of measure and measured value is converted. In some embodiments, the order the units of measure are encountered do not matter at all—the only thing that is important is that they are converted to the same unit of measure so that the magnitudes being compared make sense. In various embodiments, the conversion will always be towards the smaller unit of measure. As an example, in FIG. 9, cell B4 has measured value "100 km" and cell C6 has measured value "100 mi". The two units of measure (km and mi) are comparable and a conversion is performed since they are different. In this example, the measure 100 for cell B4 in unit of measure km is converted to the measure 62.14 in the unit of measure mi based on the unit of measure of cell C4. The relational operator greater than is applied to the converted measure 62.14 of cell B4 and the measure 100 of cell C4 and the Boolean result FALSE is displayed in cell D4.

Figure 10:
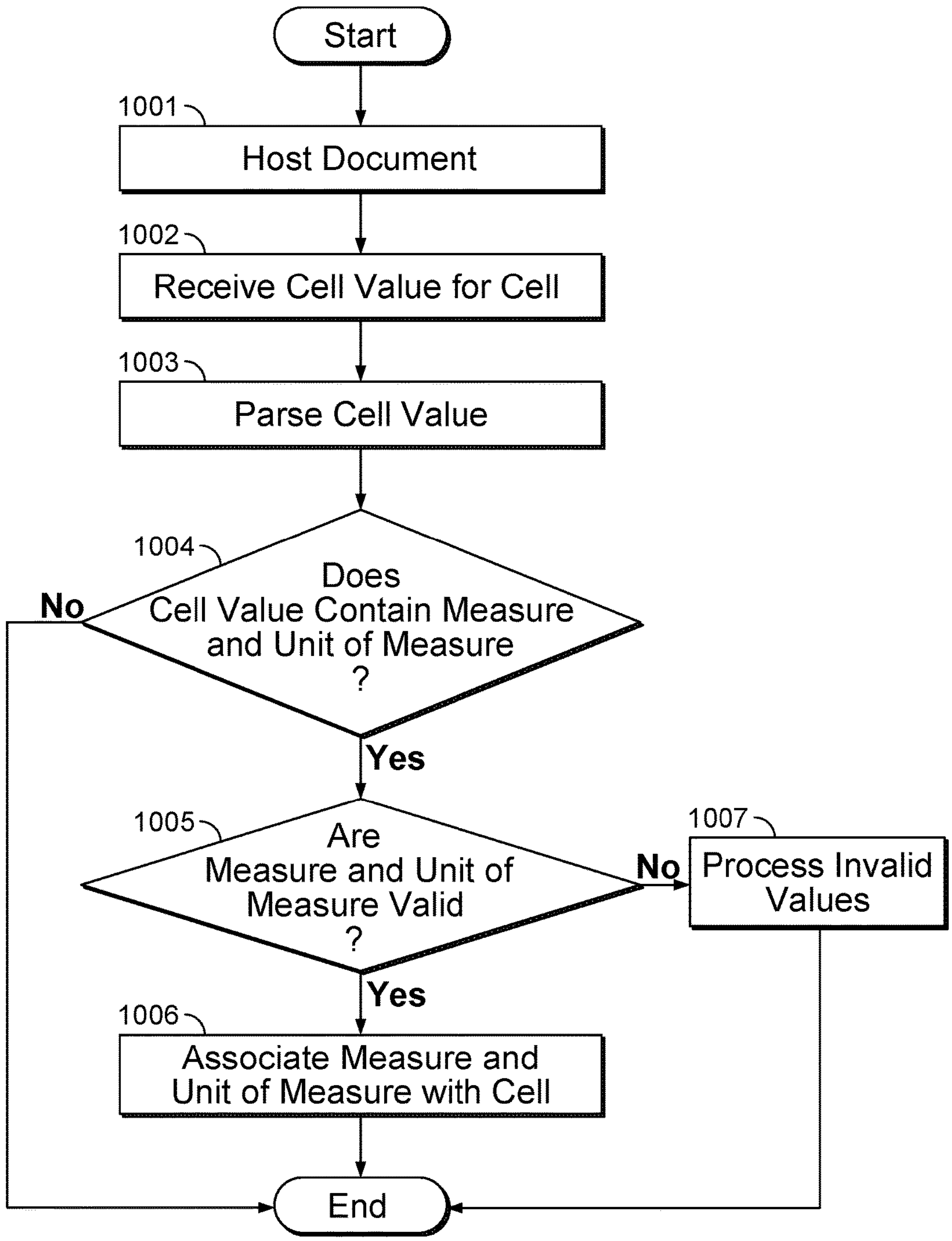
FIG. 10 is a flow diagram illustrating an embodiment of a process for parsing units of measure for spreadsheet cell values.

FIG. 10 is a flow diagram illustrating an embodiment of a process for parsing units of measure for spreadsheet cell values. In some embodiments, the process of FIG. 10 executes on application server 111 of FIG. 1 using processor 112 of FIG. 1. In some embodiments, the process of FIG. 10 is used to enter the measured values into cells used as arguments for different operators as found in FIGS. 4-9 described above. In the example shown, in 1001, a document is hosted. For example, a spreadsheet document is hosted on a single server or on a SaaS platform. In some embodiments, a user logs in via a user interface client in order to access the hosted document. In various embodiments, logging into the user interface client comprises entering a username and password into a terminal or other prompt, entering a uniform resource locator (URL) into a Web browser, executing an application, or any other appropriate method of logging into the user interface client. In 1002, a cell value is received for a cell. For example, the cell value is entered by a user into a spreadsheet application or calculated using a formula. In 1003, the cell value is parsed. For example, the cell value is stored as a text string that the spreadsheet application analyzes by parsing the text string for tokens corresponding to a measure and a unit of measure. In some embodiments, a delimiter is used to assist the parsing functionality in analyzing the cell value for a measure and a unit of measure. In various embodiments, a space or another appropriate character or string of characters is used as a delimiter. In 1004, it is determined whether the cell value contains a measure and a unit of measure. For example, the result of parsing the cell value is used to determine whether the cell value includes a measure and a unit of measure. In some embodiments, the cell value includes a valid measure and valid unit of measure. In some embodiments, a cell value includes a dimensionless measure. In the event the cell value does not contain a measure and unit of measure, the process for parsing units of measure for the cell ends. In the event that the cell value contains a measure and unit of measure, in 1005 it is determined whether the measure and unit of measure are valid. In some embodiments, a measure and unit of measure are valid in the event that the unit of measure is supported by the spreadsheet application and document. In some embodiments, the spreadsheet application determines that a unit of measure is supported by comparing the unit of measure to a known set of supported units of measure. In various embodiments, the measure and unit of measure are valid in the event that the measure and unit of measure are compatible. In some embodiments, some units of measure require that the associated measure follow certain requirements. As an example, in some spreadsheet documents, a measure for a particular unit of measure must not be negative. In the event the measure and unit of measure are valid, in 1006 a measure and a unit of measure are associated with the cell. For example, the valid measure and valid unit of measure are associated with the cell. In some embodiments, the associated valid measure and valid unit of measure together form a measured value. In the event that the measure and unit of measure are not both valid, in 1007 invalid values are processed. For example, the spreadsheet application processes the invalid values. In some embodiments, the cell is interpreted as a text input in the event that no valid value for a unit of measure is identified. In various embodiments, an indication is provided that the measure and the unit of measure are not valid, an error message (e.g., #VALUE!) is displayed in the cell, or any other appropriate processing. In some embodiments, suggested fixes to the measure or unit of measure are presented to the user. For example, a list of suggested valid units of measure is presented to the user based on the context of the cell.

Figure 11:
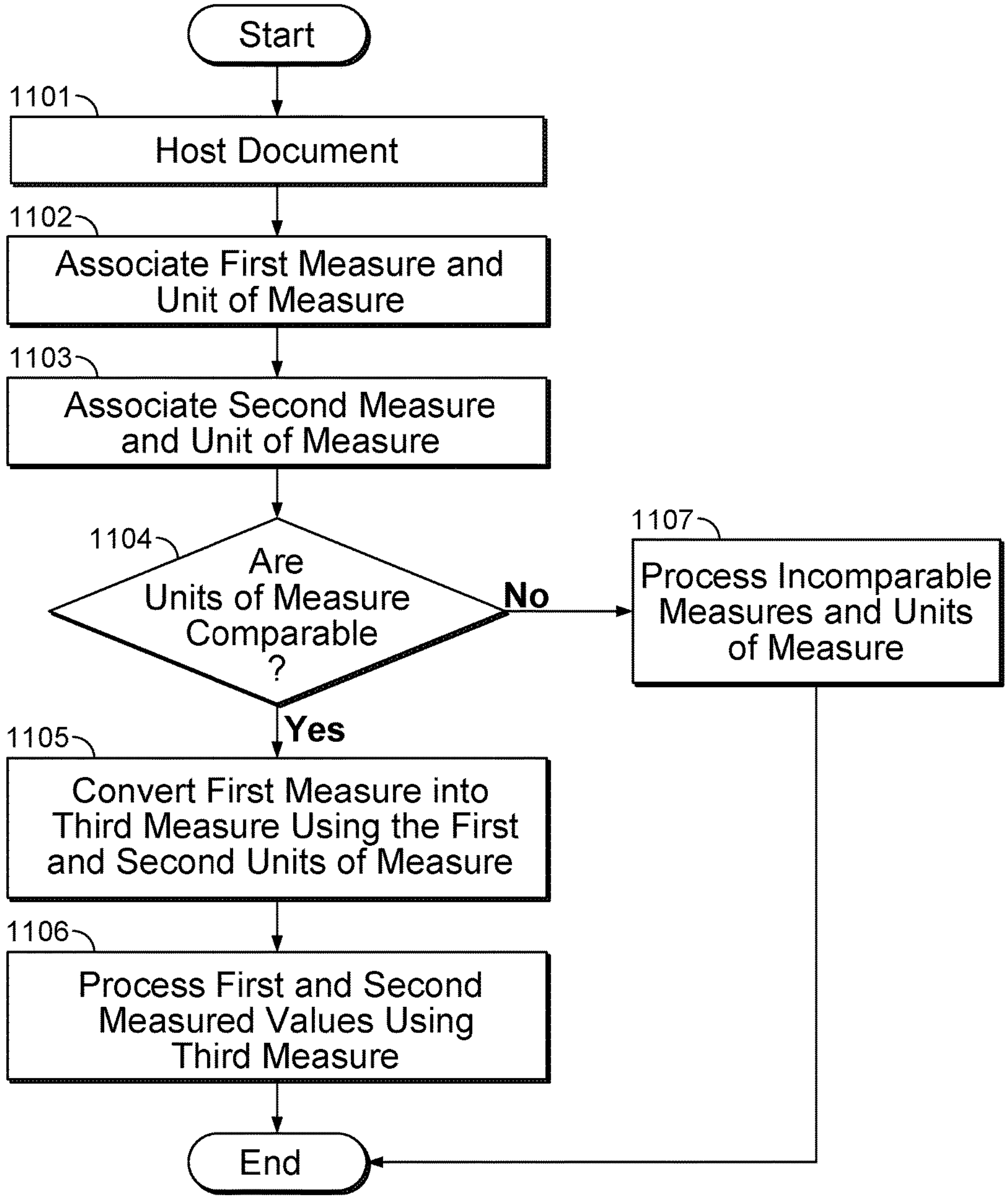
FIG. 11 is a flow diagram illustrating an embodiment of a process for converting units of measure for spreadsheet cell values.

FIG. 11 is a flow diagram illustrating an embodiment of a process for converting units of measure for spreadsheet cell values. In some embodiments, the process of FIG. 11 executes on application server 111 of FIG. 1 using processor 112 of FIG. 1. In some embodiments, the process of FIG. 11 is used to convert measured values. Examples of converted measured values are described herein with respect to FIGS. 4-9. In the example shown, in 1101, a document is hosted. For example, a spreadsheet document is hosted on a single server or on a SaaS platform. In 1102, a first measure and a first unit of measure are associated. For example, the spreadsheet application associates a first measure and a first unit of measure. In 1103, a second measure and a second unit of measure are associated. For example, the spreadsheet application associates a second measure and a second unit of measure. In some embodiments, this association creates a second measured value. In some embodiments, associating a measure with a unit of measure creates a measured value. In 1104, it is determined whether the units of measure are comparable. For example, it is determined whether the first unit of measure and the second unit of measure are comparable. In some embodiments, units of measure are comparable in the event that they are units of measure in the same dimension. For example, miles and kilometers are comparable since both units of measure are in the dimension that measures length. In some embodiments, the dimensions the supported units of measure belong to are configured into the spreadsheet application. In the event the units of measure are comparable, in 1105 the first measure is converted into a third measure using the first unit of measure and the second unit of measure. In some embodiments, the third measure is a measure in the unit of measure of the second unit of measure. In some embodiments, the conversion is based on a relationship between the first and second units of measure and relies on mathematical transformations. In some embodiments, a mathematical transformation includes the identity transform. In 1106, the first and second measured values are processed using the third measure. In some embodiments, the processing associates the third measure with the second unit of measure to create a third measured value. In some embodiments, the third measured value is passing between different functionalities of the spreadsheet application to implement additional spreadsheet functionality such as unit-based operators. As an example, using the addition operator described above, a first measured value is converted into a third measured value and returned to the addition operator functionality. The addition operator functionality proceeds to add the second measured value with the third measured value to produce the resulting measured value. In the event the units are not comparable, in 1107 the incomparable measures and units of measure are processed. In various embodiments, the processing includes displaying an error message (e.g., #VALUE!) in a cell, includes indicating that the units of measure are not comparable, or any other appropriate processing. In some embodiments, suggested fixes to the measure or unit of measure are presented to the user. For example, a list of suggested comparable units of measure is presented to the user based on the incomparable units of measure. In some embodiments, the error processing is based on the context of the measured values (e.g., the formula, operator, and other measured values provide context for correcting the incomparable units of measure).

Figure 12:
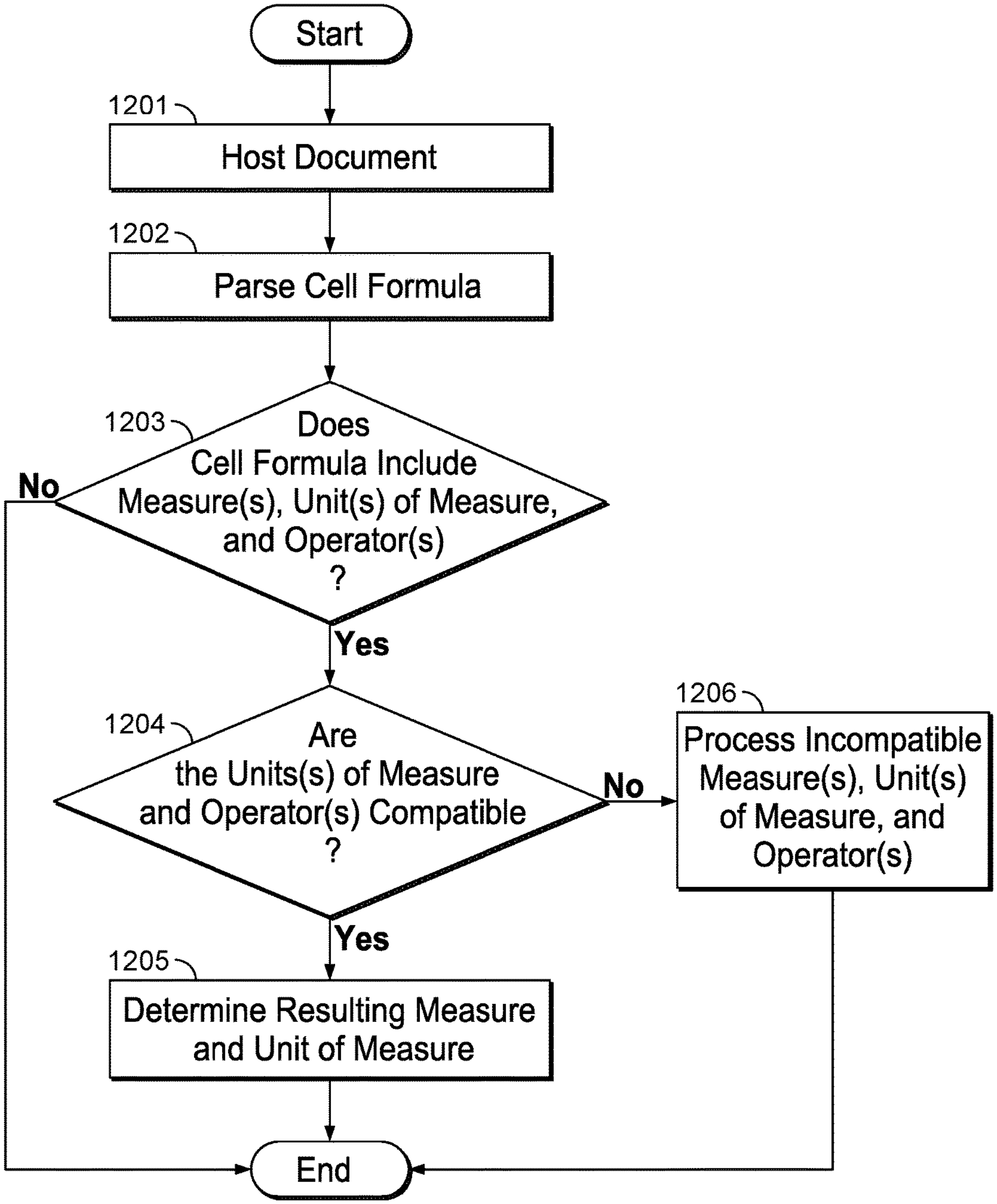
FIG. 12 is a flow diagram illustrating an embodiment of a process for performing units-based math for spreadsheet cell values.

FIG. 12 is a flow diagram illustrating an embodiment of a process for performing units-based math for spreadsheet cell values. In some embodiments, the process of FIG. 12 executes on application server 111 of FIG. 1 using processor 112 of FIG. 1. In some embodiments, the process of FIG. 12 is used to implement the spreadsheet operators described herein and in the embodiments shown in FIGS. 4-9. In the example shown, in 1201, a document is hosted. For example, a spreadsheet document is hosted on a single server or on a SaaS platform. In 1202, a cell formula is parsed. For example, the spreadsheet application parses a cell formula. In some embodiments, the cell formula is stored as a text string and parsing analyzes the text string for tokens corresponding to a measure, a unit of measure, and an operator. In some embodiments, the cell formula is partially processed and comprises a parsed measured value and/or operator. In some embodiments, the cell formula includes a single operator and a single measure and a single unit of measure. In some embodiments, the cell formula includes one or more operators and one or more measured values (a measure and unit of measure pair). In some embodiments, the cell formula includes one or more dimensionless measures. In the example shown in FIG. 12 in 1203, it is determined whether a cell formula contains measure(s), unit(s) of measure, and operator(s). For example, it is determined whether the cell formula includes at least a measure, a unit of measure, and an operator. In the event the cell formula contains one or more measures, one or more units of measure, and one or more operators, in 1204 it is determined whether the unit(s) of measure and operator are compatible. For example, it is determined whether the one or more units of measure and one or more operators are compatible. In some embodiments, whether operator(s) and the corresponding measure(s) and unit(s) of measure are compatible is dependent on the particular operator. Examples of spreadsheet operators and rules of compatibility are described herein and embodiments of spreadsheet operators are displayed in FIGS. 4-9. In the event operator(s) and the corresponding measure(s) and unit(s) of measure are compatible, in 1205 the resulting measure and unit of measure is determined. For example, the resulting measure and unit of measure is determined by applying the operator(s) to the measure(s) and unit(s) of measure. Examples of resulting measured values from applying a spreadsheet operator are described herein and embodiments of spreadsheet operators are displayed in FIGS. 4-9. In some embodiments, the resulting measure and unit of measure is associated into a measured value.

In the example shown in FIG. 12, in the event operator(s) and the corresponding measure(s) and unit(s) of measure are incompatible, in 1206 incompatible measure(s), unit(s) of measure, or operator(s) are processed. In some embodiments, the processing includes displaying an error message (e.g., #VALUE!) in a cell. In some embodiments, an indication is provided that the unit(s) of measure and the operator(s) are not compatible. In some embodiments, suggested fixes to the operator, measure, and/or unit of measure are presented to the user. For example, a list of suggested compatible units of measure and/or operators is presented to the user. In some embodiments, the list is based on the incompatible operator(s), measure(s), unit(s) of measure, and the context of cell formula. In some embodiments, an abbreviated or detailed description of the operator(s) and its/their usage are displayed to the user.

FIG. 13 is a table illustrating an embodiment of unit-based functions for a spreadsheet application. Using the techniques and technology described herein, in some embodiments, additional functions to operate on numeric values are implemented. In some embodiments, the additional functions are implemented as built-in functions. The functions of FIG. 13 are listed in the first column labeled "Function" and include: SUM, AVERAGE, PRODUCT, COUNT functions, and RANDBETWEEN. The behavior of the function is described in the second column of FIG. 13 labeled "Behavior". The SUM function requires that all supplied ranges are comparable in order for the measured values to be compatible and for the result of SUM to produce a valid measured result. In the event the measured values are not comparable, an error results. In some embodiments, an indication is provided in the event that an error occurs. In some embodiments, the message #VALUE! is displayed in the formula's cell. The AVERAGE function has similar behavior as SUM. The PRODUCT function has similar behavior as if applying the multiplication operator to all values. The COUNT family of functions is compatible with measured values that are not comparable as well as dimensionless units. The RANDBETWEEN function requires that the measured values passed as arguments are comparable and returns a measured value in the first unit of measure supplied to the function.

In some embodiments, a function TOUNITS( ) is supported. The function takes as arguments a measured value and a target unit of measure. In some embodiments, the function follows the syntax: TOUNITS(value, target_unit_of_measure) and is a built-in function. The argument value is the measured value to convert and the argument target_unit_of measure corresponds to the resulting unit of measure. The measured value is converted to the target unit of measure. The argument measured value and target unit of measure are incompatible if the measured value's unit of measure is not comparable to the target unit of measure. In the event the arguments are incompatible, the result is an error. In various embodiments, an error result or indication (e.g., #VALUE!) is returned, or any other appropriate error response. In some embodiments, in the event the target unit of measure is not known, a different result (e.g., #N/A) is returned. As an example, the formula=TOUNITS(SUM (B1:B10), "EUR") sums the currency values in cells B1:B10 and converts the result to use the currency unit of measure euros.

In some embodiments, a function UNITS( ) is supported. The function takes as an argument a measured value and returns a representation of the units of measure. In some embodiments, the representation is a text representation. As an example, the formula=UNITS(TOUNITS(5,"m/s")) takes measured value "5 m/s" as an argument and returns "m/s" as the result. In some embodiments, in the event that the value is a dimensionless number then the function returns an empty string. For other types of non-numeric arguments, the function returns an error result (e.g., #VALUE!).

In some embodiments, a function DIMENSIONS( ) is supported. The function takes as an argument a measured value and returns a representation of the dimensions that compose the unit of measure of the argument. In some embodiments, the representation is a text representation. As an example, the formula=DIMENSIONS(TOUNITS(5, "m/s")) takes measured value "5 m/s" as an argument and returns [L]/[T] as the result where L is the length dimension and T is the time dimension. In some embodiments, in the event that the value is a dimensionless number then the function returns an empty string. For other types of non-numeric arguments, the function returns an error result (e.g., #VALUE!).

Using the techniques and technology described herein, in some embodiments, additional functions are available for specific domains. These functions include but are not limited to: engineering conversions, financial functions, functions that return time intervals, trigonometric functions, and statistical functions. In some embodiments, engineering conversions work on measured values with the unit of measure not changing.

In some embodiments, financial functions operate on currency values. In the event that the result of a financial function is also a currency, then it is associated with a related currency unit of measure. In some embodiments, the associated currency unit of measure is the same currency unit of measure supplied as an argument. In various embodiments, the associated currency unit of measure is configured using appropriate configuration techniques. An example configuration is setting a default currency for a particular user.

In some embodiments, any function that returns a time interval has the resulting measure associated with a time unit of measure. For example, in some embodiments, the function COUPDAYS( ) returns the number of days in a coupon period. The returned value is a measured value with a unit of measure day.

In some embodiments, Table 1 below provides an illustrating example of supported units of measure. In some embodiments, units of measure are entered by a user and shown to a user using an abbreviation. In some embodiments, a unit of measure has multiple abbreviations. Table 1 lists an example set of supported units of measure and includes example abbreviations and the dimension in which the unit of measure belongs. In various embodiments, dimensions include: currency, length, mass, time, data, area, volume, temperature, and speed, or any other appropriate dimensions. In some embodiments, the dimension is associated with a unit of measure and is used by the spreadsheet application to help determine whether two units of measure are comparable. For example, both units of measure USD and EUR are in the dimension "currency" and are comparable. In contrast, units of measure USD and m belong to different dimensions (currency and length) and are not comparable.

In some embodiments, the supported units of measure include the International System of Units. In some embodiments, all units defined in Java Specification Requests 363: Units of Measurement API (JSR-363) are supported. In some embodiments, the supported units of measure are case sensitive.

In some embodiments, the supported units of measure are configured. Different levels of granularity of configuration include: sheet, workbook, user, group, department, and other appropriate levels. As an example, for a selected group of individuals, the supported units of measure are the International System of Units. As another example, for a particular spreadsheet, the supported units of measure can include only the dimensions currency and time.

TABLE 1

Supported Units of Measure

| Unit of Measure | Dimension | Description |
|---|---|---|
| USD | Currency | U.S. dollars |
| EUR | Currency | Euro |
| CAD | Currency | Canadian dollars |
| $ | Currency | US dollars |
| m | Length | Meters |
| km | Length | Kilometers |
| mi | Length | Miles |
| in | Length | Inches |
| ft | Length | Feet |
| yd | Length | Yards |
| mm | Length | Millimeters |
| cm | Length | Centimeters |
| au | Length | Astronomical Units |
| g | Mass | Grams |
| kg | Mass | Kilograms |
| mg | Mass | Milligrams |
| lb | Mass | Pounds |
| oz | Mass | Ounces |
| yr | Time | Years |
| mo | Time | Months |
| d | Time | Days |
| wk | Time | Weeks |
| h, hr | Time | Hours |
| min | Time | Minutes |
| s | Time | Seconds |

TABLE 1-continued

Supported Units of Measure

| Unit of Measure | Dimension | Description |
|---|---|---|
| ms | Time | Milliseconds |
| ns | Time | Nanoseconds |
| um | Time | Microseconds |
| KB, kB | Data | Kilobytes |
| MB | Data | Megabytes |
| GB | Data | Gigabytes |
| TB | Data | Terabytes |
| PB | Data | Petabytes |
| EB | Data | Exabytes |
| $m^2$, m^2 | Area | Square meters |
| $km^2$, km^2 | Area | Square kilometers |
| $cm^2$, cm^2 | Area | Square centimeters |
| $mm^2$, mm^2 | Area | Square millimeters |
| acre | Area | Acres |
| $in^2$, in^2 | Area | Square inches |
| $ft^2$, ft^2 | Area | Square feet |
| $yd^2$, yd^2 | Area | Square yards |
| $mi^2$, mi^2 | Area | Square miles |
| l | Volume | Liter |
| ml | Volume | Milliliter |
| $m^3$, m^3 | Volume | Cubic meters |
| $km^3$, km^3 | Volume | Cubic kilometers |
| $mm^3$, mm^3 | Volume | Cubic millimeters |
| $in^3$, in^3 | Volume | Cubic inches |
| $ft^3$, ft^3 | Volume | Cubic feet |
| $yd^3$, yd^3 | Volume | Cubic yards |
| K | Temperature | Kelvin |
| C | Temperature | Celsius |
| F | Temperature | Fahrenheit |
| mph | Speed | Miles per hour |
| kph | Speed | Kilometers per hour |

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for converting units of measure for spreadsheet cell values, comprising:

a processor configured to:

host a spreadsheet document;

identify a first measured value in a first cell of the spreadsheet document, wherein the first measured value comprises a first measure and a first unit of measure;

identify a second measured value in a second cell of the spreadsheet document, wherein the second measured value comprises a second measure and a second unit of measure, wherein the first unit of measure is different from the second unit of measure;

identify an operator that is applied to the first measured value and the second measured value, wherein the operator is an addition operation, a subtraction operation, or a relational operation;

determine whether the first unit of measure and the second unit of measure are comparable, wherein the first unit of measure and the second unit of measure are comparable in response to a determination that the first unit of measure and the second unit of measure have the same dimensions; and in response to a determination that the first unit of measure and the second unit of measure are comparable, convert one of the first unit of measure and the second unit of measure to the other unit of measure, comprising to:

determine whether a single unit of the first unit of measure is larger than or equal to a single unit of the second unit of measure; and in response to a determination that the single unit of the first unit of measure is larger than or equal to the single unit of the second unit of measure, convert the first measured value to a third measured value, the third measured value being associated with the second unit of measure.

2. The system of claim 1, wherein the first measure and the second measure are numeric values.

3. The system of claim 1, wherein the first unit of measure and the second unit of measure are distinct from display formats.

4. The system of claim 1, wherein one of the first unit of measure and the second unit of measure is a dimensionless unit.

5. The system of claim 1, wherein in response to a determination that the first unit of measure and the second unit of measure are not comparable, the processor is further configured to display an error message.

6. The system of claim 1, wherein in response to a determination that the first unit of measure and the second unit of measure are not comparable, the processor is further configured to store an error value in a spreadsheet cell.

7. The system of claim 1, wherein the processor is further configured to receive a cell value entered into the spreadsheet document.

8. A method for converting units of measure for spreadsheet cell values, comprising:

hosting a spreadsheet document;

identifying a first measured value in a first cell of the spreadsheet document, wherein the first measured value comprises a first measure and a first unit of measure;

identifying a second measured value in a second cell of the spreadsheet document, wherein the second measured value comprises a second measure and a second unit of measure, wherein the first unit of measure is different from the second unit of measure;

identifying an operator that is applied to the first measured value and the second measured value, wherein the operator is an addition operation, a subtraction operation, or a relational operation;

determining, using a processor, whether the first unit of measure and the second unit of measure are comparable, wherein the first unit of measure and the second unit of measure are comparable in response to a determination that the first unit of measure and the second unit of measure have the same dimensions; and in response to a determination that the first unit of measure and the second unit of measure are comparable, converting one of the first unit of measure and the second unit of measure to the other unit of measure, comprising:

determining whether a single unit of the first unit of measure is larger than or equal to a single unit of the second unit of measure; and in response to a determination that the single unit of the first unit of measure is larger than or equal to the single unit of the second unit of measure converting the first measured value to a third measured value, the third measured value being associated with the second unit of measure.

9. A computer program product for converting units of measure for spreadsheet cell values, the computer program product being embodied in a non-transitory computer readable storage medium and comprising computer instructions for:

hosting a spreadsheet document;

identifying a first measured value in a first cell of the spreadsheet document, wherein the first measured value comprises a first measure and a first unit of measure;

identifying a second measured value in a second cell of the spreadsheet document, wherein the second measured value comprises a second measure and a second unit of measure, wherein the first unit of measure is different from the second unit of measure;

identifying an operator that is applied to the first measured value and the second measured value, wherein the operator is an addition operation, a subtraction operation, or a relational operation;

determining, using a processor, whether the first unit of measure and the second unit of measure are comparable, wherein the first unit of measure and the second unit of measure are comparable in response to a determination that the first unit of measure and the second unit of measure have the same dimensions; and in response to a determination that the first unit of measure and the second unit of measure are comparable, converting one of the first unit of measure and the second unit of measure to the other unit of measure comprising:

determining whether a single unit of the first unit of measure is larger than or equal to a single unit of the second unit of measure; and in response to a determination that the single unit of the first unit of measure is larger than or equal to the single unit of the second unit of measure, converting the first measured value to a third measured value, the third measured value being associated with the second unit of measure.

* * * * *

UNITED STATES PATENT AND TRADEMARK OFFICE

CERTIFICATE OF CORRECTION

PATENT NO. : 10,437,922 B2
APPLICATION NO. : 14/958778
DATED : October 8, 2019
INVENTOR(S) : Terry M. Olkin and Brian Sean Morris It is certified that error appears in the above-identified patent and that said Letters Patent is hereby corrected as shown below:

In the Claims

In Column 24, Line 9, Claim 8 after “measure”, insert --,--.

In Column 24, Line 41, Claim 9 after “other unit of measure”, insert --,--.

Signed and Sealed this
Second Day of June, 2020

Andrei Iancu
*Director of the United States Patent and Trademark Office*